United States Patent [19]

Shu et al.

[11] Patent Number: 5,739,917
[45] Date of Patent: Apr. 14, 1998

[54] ERROR-DIFFUSION-TYPE HALF-TONING EMPLOYING ADAPTIVE THRESHOLDING FOR ENHANCED SMOOTHNESS

[75] Inventors: Joseph S. Shu, San Jose; Jack Boyce, El Cerrito, both of Calif.

[73] Assignee: Seiko Epson Corporation, Tokyo, Japan

[21] Appl. No.: 679,644

[22] Filed: Jul. 12, 1996

[51] Int. Cl.$^6$ .............................. H04N 1/40; H04N 1/46; G03F 3/08; G06K 9/36
[52] U.S. Cl. .................. 358/298; 358/466; 358/518; 358/534; 382/239; 382/252
[58] Field of Search ...................... 358/298, 448, 358/454, 465, 466, 518, 523, 530–536; 382/162, 167, 232, 237, 239, 251, 252; 395/101, 109, 112

[56] References Cited

U.S. PATENT DOCUMENTS

| | | | |
|---|---|---|---|
| 4,554,593 | 11/1985 | Fox et al. | 358/466 |
| 4,682,186 | 7/1987 | Sasaki et al. | |
| 4,958,218 | 9/1990 | Katayama et al. | 358/530 |
| 4,959,790 | 9/1990 | Morgan. | |
| 5,111,302 | 5/1992 | Chan et al. | 358/298 |
| 5,387,987 | 2/1995 | Ino | 358/466 X |
| 5,402,245 | 3/1995 | Motta et al. | 358/298 |
| 5,428,377 | 6/1995 | Stoffel et al. | 358/529 |
| 5,469,276 | 11/1995 | Shu | 358/534 |
| 5,473,446 | 12/1995 | Perumal, Jr. et al. | 358/523 |
| 5,475,800 | 12/1995 | Vaughn et al. | 395/109 |
| 5,488,672 | 1/1996 | Mita | 382/167 |
| 5,488,673 | 1/1996 | Katayama et al. | 382/267 X |
| 5,497,180 | 3/1996 | Kawakami et al. | 347/131 |

*Primary Examiner*—Eric Frahm
*Attorney, Agent, or Firm*—Joseph Born

[57] ABSTRACT

A printer driver for a color printer employs an error-diffusion-type half-toning process in which different quantization thresholds are employed for different ones of the color components. The color component whose value is highest after augmentation by accumulated error is compared with a relatively low threshold to determine the binary output value for that component. The lowest error-augmented component value is compared with a relatively high quantization threshold, and the component whose value is between those of the other two is compared with an intermediate-valued quantization threshold. Varying the thresholds in this manner tends to discourage coincidences of different-colored imaging agents at the same pixels and thus tends to result in light colors' having a smoother appearance.

28 Claims, 5 Drawing Sheets

ERROR-DIFFUSION-TYPE HALF-TONING EMPLOYING ADAPTIVE THRESHOLDING FOR ENHANCED SMOOTHNESS

BACKGROUND OF THE INVENTION

The present invention is directed to printers and in particular to color printers that employ error-diffusion-type half-toning.

At some point in the storage and processing of digital images, most are represented as arrays of picture elements ("pixels") whose values are expressed with a relatively fine value resolution: each of the three component values of which a color pixel value usually consists is commonly expressed with a resolution of eight or twelve bits. But mechanisms for printing the images cannot typically print a pixel with that fine a value resolution. Indeed, the printing process at a given pixel is usually only binary: the only choice is whether or not to deposit a fixed-size ink drop or other printing agent. Even in printers that do provide choices among dot sizes, the value resolution is ordinarily much coarser than the original pixel values resolution.

To simulate the original image's value resolution, printers are usually so controlled as to trade position resolution for value resolution. Specifically, the printer driver so controls the printer as to deposit the printing agent at different percentages of pixels in a region in response to different original-image values.

One common way of achieving this result is to employ "ordered dither." In accordance with this approach, a threshold matrix conceptually overlies the image medium so as to associate different thresholds with different pixel locations on that medium. A given pixel location receives a given color imaging agent if the value of the original image's corresponding component value exceeds the associated dither-matrix threshold.

So it is not only the corresponding image-pixel value but also the dither-threshold value that determines whether a given location will receive the imaging agent: a relatively high image-pixel value will not result in an ink dot if the corresponding print-medium location is associated with an even higher dither-matrix threshold, while a lower-value pixel may receive an ink dot if the corresponding print-medium location is associated with an even lower dither-matrix threshold. But a relatively high original-image pixel value is nonetheless more likely to result in imaging-agent deposition than a lower-valued pixel is, so the result over a large number of pixels reflects the source pixel values. Still, the probabilistic nature of this type of half-toning does leave the possibility of occasional anomalous results, and there are applications in which it is considered desirable to employ approaches that reduce such results probability.

One such approach is error-diffusion-type half-toning. Just as in ordered-dither-type half-toning, a fine-resolution value is compared in error-diffusion-type half-toning with a quantization threshold. But the error-diffusion threshold is independent of pixel location and is usually fixed at, say, half of the pixel-value range. Ink is deposited only if the fine-resolution value exceeds that threshold.

The error-diffusion technique is based on the recognition that an "error" thereby results unless the fine-resolution value is zero or one-hundred percent of the fine-resolution range: although most original pixel values do not call for zero percent or one hundred percent of the possible color darkness, a given pixel can be printed with only those two values. (As was mentioned above, some printers are capable of printing a very limited number of values between zero and one hundred percent, but this merely reduces the error to some extent; it does not eliminate it.) To compensate for this error, the error-diffusion process distributes the error to neighboring pixels so as to augment the original-image pixel-component value before comparison with the quantization threshold. For instance, even if the original-component value at a given pixel does not itself exceed half the range, that value may be augmented by the error that resulted when no ink dot was deposited at a neighboring pixel, and the two pixels' component values would thus cause the imaging agent to be deposited at one of those pixel locations even though neither value is alone adequate to cause the imaging agent to be deposited.

Error diffusion is thus more accurate in a sense than ordered dither. But it is nonetheless a quantization process and therefore shares a drawback with ordered dither and other half-toning processes, namely, that a light-color-value original image can result in a lack of smoothness in the printed image. Since half-toning responds to a low-darkness original image by depositing the imaging agent on a low percentage of the print-medium pixels, the ink dots or other imaging agents can be deposited so sparsely that the viewer's eye undesirably notices the individual dots instead of integrating many closely spaced dots into an overall color impression.

SUMMARY OF THE INVENTION

Although this effect cannot be completely eliminated, we have found a way of reducing it that is simple to implement and retains the accuracy advantages of the error-diffusion process. Our approach reduces the likelihood that different-colored inks will coincide in the same pixel location. It thereby increases the total number of pixel locations at which the printer deposits ink of some sort, and this increase in the number of printed pixels increases the subjective impression's smoothness. Although previous printing techniques, such as that described in U.S. Pat. No. 5,111,302 to Chan et al., have indeed resulted in minimizing the coincidence of different-colored inks in the same pixel locations, none has done so and preserved the benefits of error-diffusion half-toning by as simple an adaptation of the basic technique error-diffusion as ours does. Specifically, we employ the basic error-diffusion process, modifying it only by using different quantization thresholds for different color components.

Specifically, we choose the threshold for a given component in accordance with the relationship between that component's value and the value of the other components of the pixel in question. For example, if the error-augmented cyan value in a cyan-magenta-yellow system is higher than the corresponding values for magenta and yellow, the decision as to whether to deposit, say, cyan-colored ink is made by comparing that high error-augmented cyan value with a relatively low threshold, making it more likely that cyan ink will be deposited, whereas the lower error-augmented values for magenta and yellow are compared with higher thresholds so that they are relatively unlikely to be deposited at the same location. This additionally increases the negative cyan error and the positive errors of the other two components, thereby reducing the likelihood that cyan will be deposited in a neighboring location and increasing the likelihood that the other components will. The result is a greater number of printed pixels and thus a smoother appearance.

BRIEF DESCRIPTION OF THE DRAWINGS

The invention discussion below refers to the accompanying drawings, of which.

DETAILED DESCRIPTION OF AN ILLUSTRATIVE EMBODIMENT

As the invention description proceeds, it will become apparent that the invention can be embodied in dedicated circuitry designed particularly to implement the invention's teachings. Such an arrangement can be included within a printer that receives instructions in terms of nominal colors or gray-scale values, and the dedicated circuitry can be designed to convert the requested values to values printer instructions in accordance with the present invention's error-diffusion approach. But the invention will more typically be implemented by a general-purpose machine, such as a personal computer operating as a printer driver, whose purpose is to convert an image expressed in nominal color values into printer commands that comply with specified printer- and medium-dependent limitations.

Figure 1:
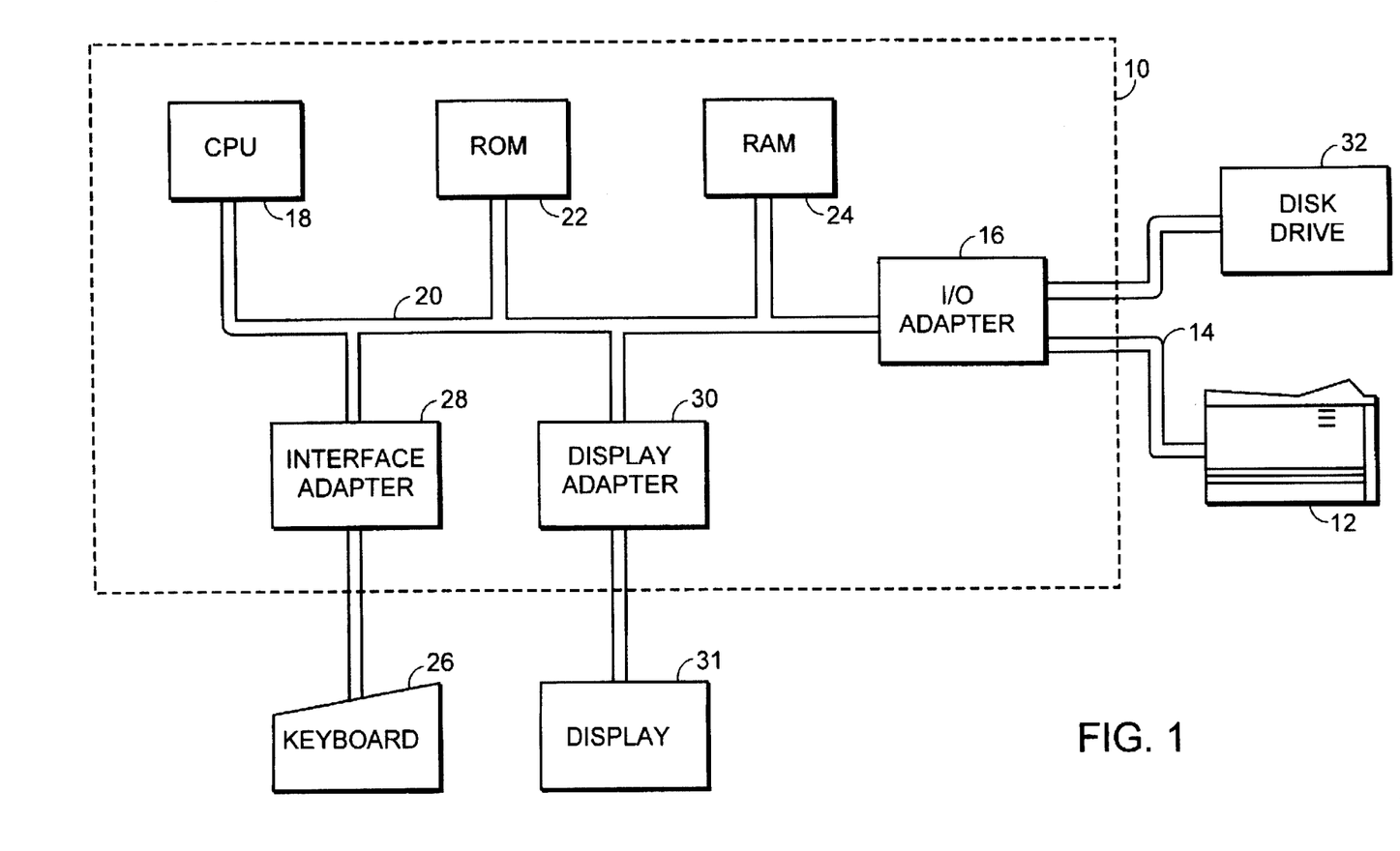
FIG. 1 is a hardware-perspective block diagram of a computer system of type in which the present invention's teachings will most typically be practiced.

FIG. 1 depicts a typical hardware environment. A personal computer 10 sends a display device such as an ink-jet printer 12 low-level instructions, i.e., instructions that specify which individual display-medium pixels should receive dots. The drawing depicts the printer 12 as receiving these instructions by way of an appropriate channel 14. Computers that can embody the present invention come in a wide variety of configurations, and FIG. 1 depicts one in which channel 14 is provided by an input-output adapter 16 with which a central processing unit 18 communicates by way of an internal bus 20.

Of course, the central processing unit 18 typically fetches data and instructions at various times from a variety of sources, such as solid-state read-only and read-write memories 22 and 24. FIG. 1 depicts the computer 10 as also communicating with the usual keyboard 26 by way of an interface adapter 28. And a display adapter 30 usually couples a cathode-ray-tube display 31 is to the central processing unit 18.

The computer 10 typically implements the present invention's teachings when it functions as a printer driver. Operating-system software transferred to the computer's disc drive 32 and stored in a disc that the drive contains usually includes instructions that configure the computer to perform this function. The driver software will often have been loaded into the computer system from another storage medium, such as a diskette or CD-ROM. In any event, the computer 10 reads the printer-driver instructions from the disc drive in most cases and then performs the below-described functions to implement the present invention's teachings.

Figure 2:
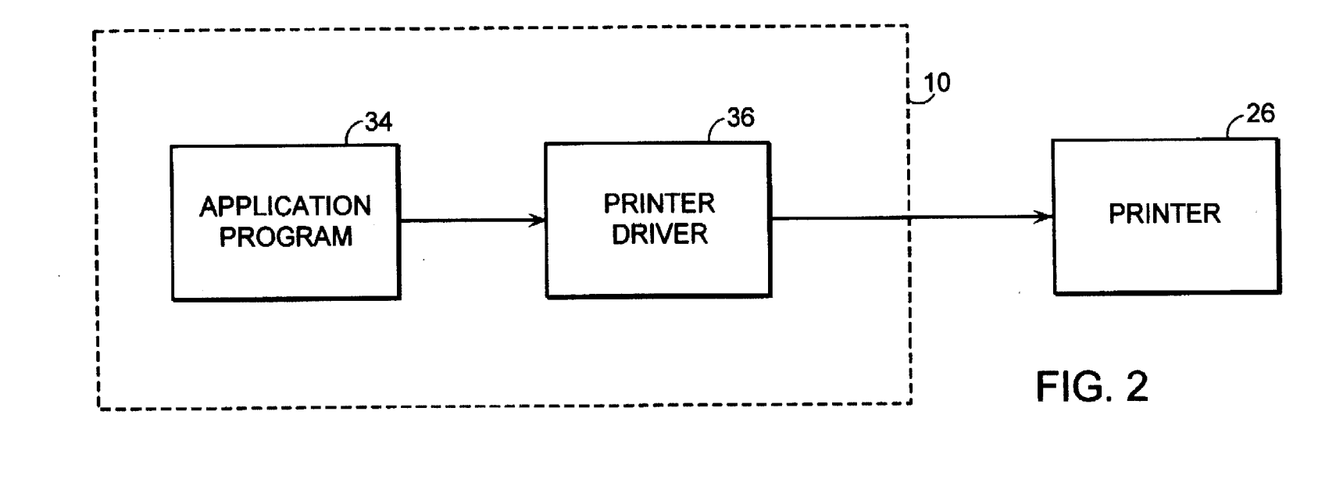
FIG. 2 is a software-perspective block diagram of the same invention.

FIG. 2 depicts the invention's environment from more of a software standpoint. The present invention's teachings usually come into play when the computer 10 is operating a user's application program 34 and that program makes a system call requesting that an image be printed. A printer driver 36, which is usually considered to be part of the operating system but is specific to the designated printer, performs the requested operation. The printer driver's purpose is to convert a device-independent representation of the image into low-level printer instructions that will cause the printer 26 to render that image as faithfully as the printer's limitations permit.

Figure 3:
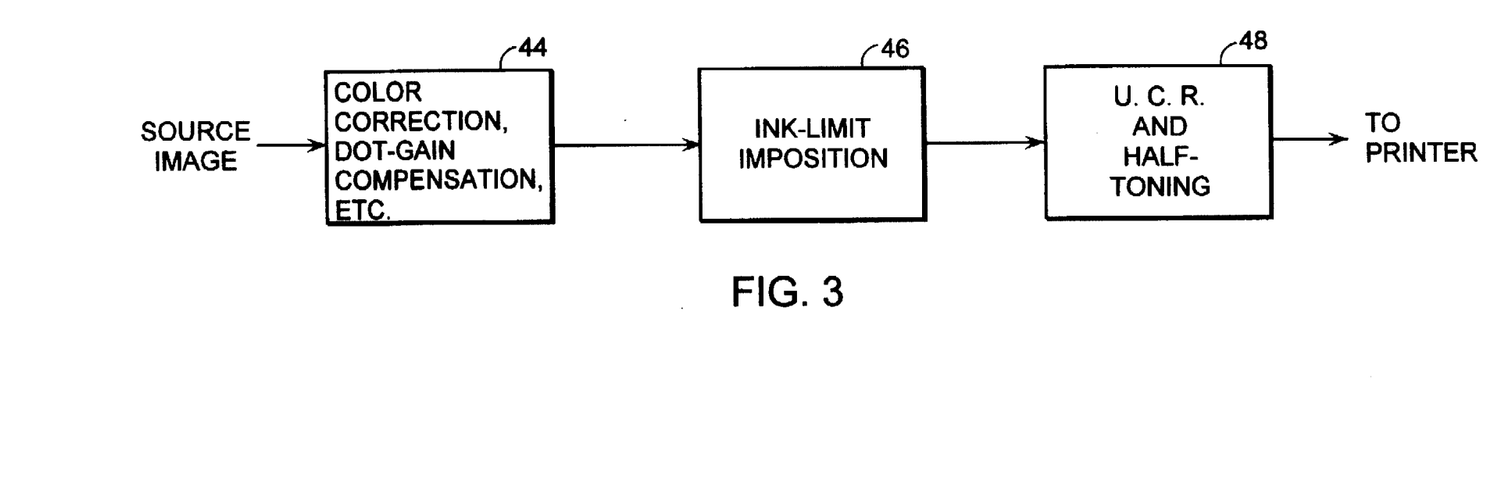
FIG. 3 is a high-level block diagram of the image-revision sequence employed by one of the invention's embodiments in generating printer instructions.

The typical printer driver performs a sequence of image-revision steps to generate print instructions from signals that represent the source image. FIG. 3 represents a typical image-revision sequence. The inks employed to display the stored image do not precisely match the ideal colors that they are intended to represent, so the printer driver typically adjusts the values from those that represent combinations of ideal colors to values that will cause the non-ideal inks to approach the intended color more closely. The driver also revises the values to account for the fact that the apparent color darkness does not increase linearly with the percentage of pixels on which ink drops are deposited. FIG. 3's block 44 represents these color-correction and "dot-gain-compensation" steps.

Once the driver has determined values that would cause the inks to approximate the requested colors most closely, it may need to compromise in order to observe the chosen medium's ability to absorb ink without bleeding. Block 46 represents the imposition of the necessary ink-duty limit. The result is a revised image consisting of pixels typically represented by three component values respectively corresponding to the cyan, magenta, and yellow inks that the color printer uses. (For ease of discussion, we assume that the printer is an ink-jet printer, but those skilled in the art will recognize that the present invention's teachings are equally applicable to printers that employ other imaging agents.) These component values are typically expressed with a relatively fine resolution, such as eight or twelve bits per color component. A half-toning step 48 that employs the present invention's teachings converts these fine-resolution values to the coarser-resolution—typically binary—resolution required for printer operation, and the printer driver then sends the printer instructions that specify these values.

Figure 4:
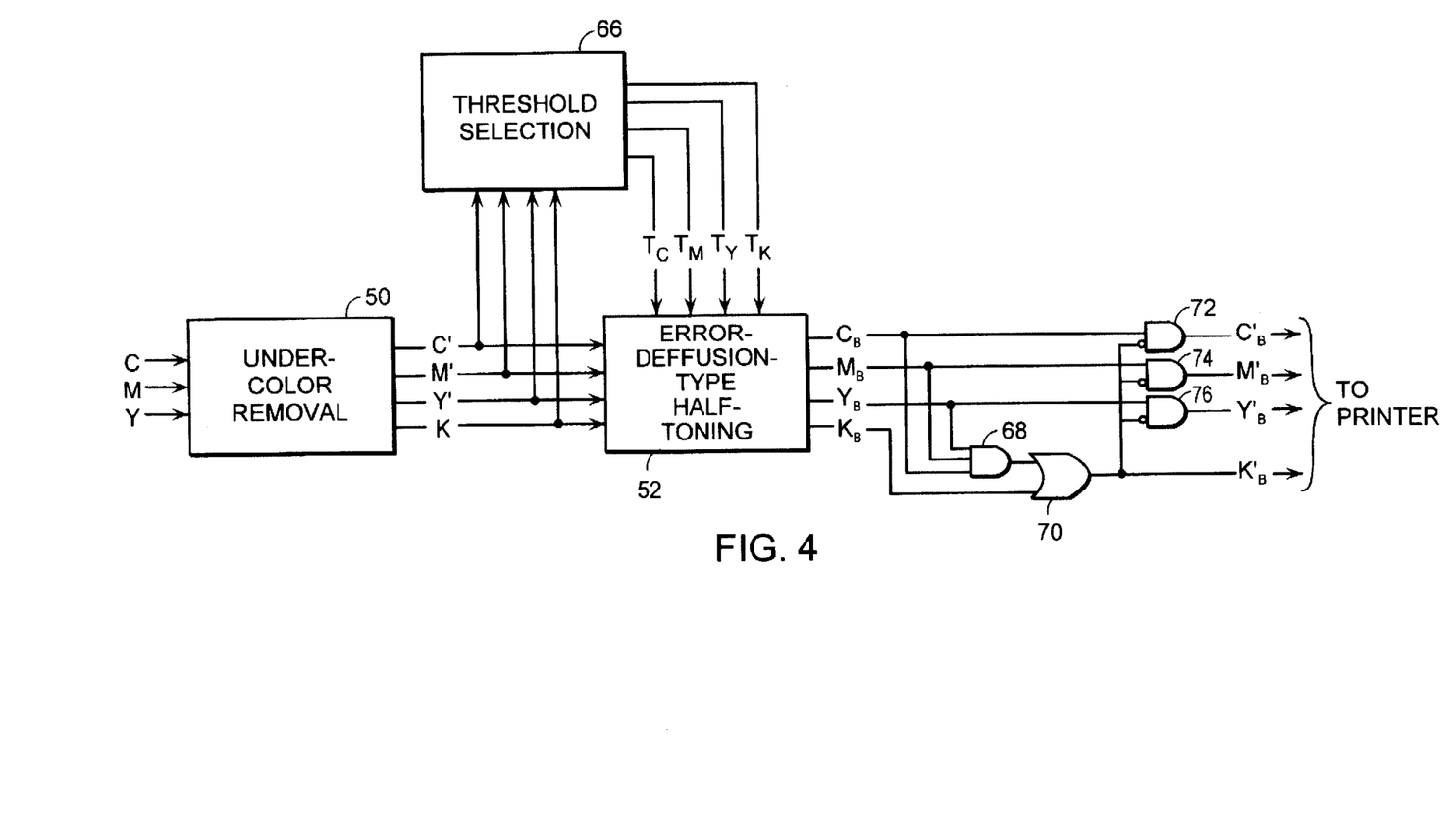
FIG. 4 is a conceptual block diagram that illustrates the half-toning step of FIG. 3 in greater detail.

FIG. 4 illustrates FIG. 3's half-toning step 48 in greater detail. For the sake of concreteness, we here assume that the printer driver additionally employs a so-called under-color-removal step, which FIG. 4's block 50 represents, to convert the image from a CMY (cyan, magenta, and yellow) representation to a CMYK (cyan, magenta, yellow, and black) representation. This is a typical feature of drivers for printers that can deposit black as well as cyan, magenta, and yellow on the same document, but a printer driver does not need to employ such a step in order to avail itself of the present invention's advantages.

Equal amounts of cyan, magenta, and yellow nominally produce black, and the undercolor-removal process's purpose is to replace equal amounts of the three colors with black ink itself. A simple way of doing this is to subtract the lowest of the C, M, and Y values from all three and assign that value to the K (black) component, but other approaches are also used.

An error-diffusion-type half-toning operation 52 receives the results of this under-color-removal process and performs an error-diffusion operation that differs from conventional error-diffusion half-toning in only one particular: the choice of quantization threshold for a given component depends on the relationship between that component's error-augmented value and those of the other components.

To appreciate this, we first consider the conventional error-diffusion half-toning process. Half-toning is a quantization process; i.e., it converts a fine-resolution value to a coarse-resolution value by comparing the fine-resolution value with a set of quantization thresholds. For instance, suppose that the fine-resolution value is expressed in eight bits and thus has a value range from 0 to 255. Let us further assume that it is to be quantized to two-bit resolution, i.e., to a resolution having a range from 0 to 3. To accomplish this, the fine-resolution value is compared with a quantization-threshold set consisting of, say, the three threshold values 63, 127, and 191. Any fine-resolution value that does not exceed 63 results the coarse-resolution value of 0. Any fine-resolution value that exceeds 63 but not 127 results in a coarse-resolution value of 1. Similarly, values between 127 and 191 are assigned a coarse-resolution value of 2, and all other fine-resolution values result in a coarse-resolution value of 3.

The half-toning process might employ such an eight-bit-to-two-bit quantization process if the printer were capable of depositing ink dots of three sizes so that the output pixel could have four possible values, including no ink at all. The present invention's teachings could be applied to such a printer. But the illustrated embodiment controls a printer that can apply dots of only a single size. Consequently, any given component can have only two values, namely, 1 and 0, respectively representing ink and no ink, and the quantization-threshold set consists of only a single threshold.

In error-diffusion half-toning, the quantization involves an error-augmented comparison of the high-resolution pixel value with a threshold. That is, the value with which the quantization threshold is compared is the color-component value as augmented by an accumulated error value, or, equivalently, the high-resolution component value is compared with the threshold augmented by that error value.

Figure 5:
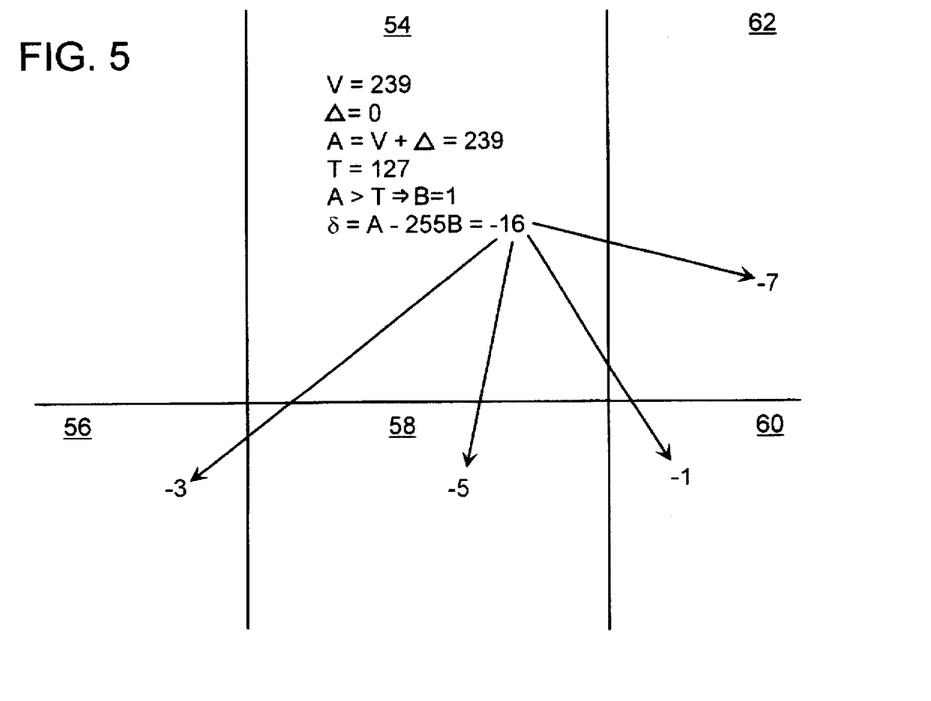
FIGS. 5 and 6 are conceptual block diagrams that illustrate the error-diffusion process.
Figure 6:
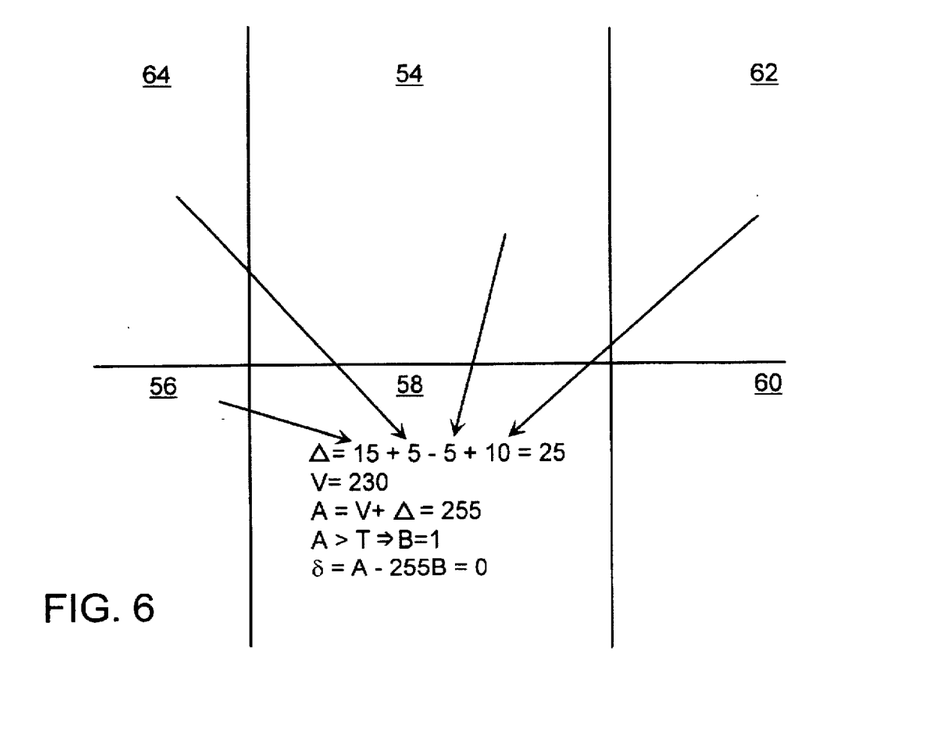

FIGS. 5 and 6 illustrate the process. We assume that a given component's value V for a pixel 54 in FIG. 5 is 239. (Here V represents one of the component values C', M', Y' and K' of FIG. 4.) The threshold T with which the comparison is to be made is 127, i.e., a value roughly half the eight-bit full-scale value 255. The threshold T is compared, not with the raw component value V but rather with an augmented value A=V+Δ, where Δ is an accumulated error, as will be explained below. But we will assume for the sake of simplicity that the accumulated error Δ for that particular component of pixel 54 is 0, so the comparison is between an augmented value A=239 and the threshold T=127. Clearly, the augmented value exceeds the threshold, so the low-resolution (in this case, binary) output value B is 1 rather than 0 and therefore indicates that an ink drop of the color corresponding to that component is to be deposited at the location that corresponds to pixel 54.

Now, the requested value, 239, is only a fraction of the maximum possible darkness value 255, yet pixel location 54 actually receives 100% of the color darkness of which the printer is capable: for that particular pixel location, the fine-resolution expression of the value actually printed is 255. So an error of 239−255=−16 results from that component's printing at the location corresponding to pixel 54.

To compensate for this error, the error-diffusion process divides this error among neighboring pixels' accumulated errors for that particular color component. Of the −16 error in that component caused by printing at pixel 54, for example, −3 could be passed to pixel 56, −5 could be passed to pixel 58, −1 to pixel 60, and −7 to pixel 62.

FIG. 6 illustrates the result of so diffusing the error. In FIG. 6, we consider pixel 58, which receives an accumulated error contribution of −5 from pixel 54. We also assume that pixel 58 receives the indicated accumulated-error contributions from pixels 56, 62, and 64 to yield a total accumulated error of 25. This augments pixel 58's value V=230 for that component to yield an augmented value of 255. This clearly exceeds the threshold T=127, so the binary result of the half-toning process for that component is B=1, indicating that ink of the associated color will be deposited at the pixel location. Again, the printer has printed that pixel location with 100% of the darkness of which it is capable, so the effective fine-resolution value at that pixel is actually 255. But since the augmented value A for that component is also 255, the error contribution resulting from printing that component at pixel location 58 is 0.

The error-diffusion process of the present invention is the same as the conventional process just described—with one exception: the threshold employed at a given pixel for a particular component depends on the relationship between that component's augmented value at that pixel and the other components' augmented values at the same pixel. A three-ink embodiment might employ three different thresholds—for example, 127, 167, and 207—and a threshold-selection operation compares a given pixel's component values with each other and assigns thresholds accordingly.

For example, if the error-augmented component values for cyan, magenta, and yellow are 140, 150, and 130, respectively, the threshold $T_M$ used in converting the fine-resolution magenta component value to the corresponding coarse-resolution magenta value is the lowest of the possible threshold values, namely, 127, because magenta has the highest augmented component value. Since yellow has the lowest augmented component value, 130, its threshold $T_Y$ is assigned the highest of the three values, namely, 207. Cyan's threshold value $T_C$ is assigned the remaining value, namely, 167.

If two error-augmented component values are the same at a particular pixel, we arbitrarily assign the two components different thresholds. For instance, if the error-augmented values for cyan and magenta had both been 150, we would still have assigned them different thresholds, assigning the 127 value to, say, cyan and the 167 value to magenta. Alternatively, they could both be assigned the same threshold.

Although this approach differs from conventional error diffusion only in the thresholds that it uses for its quantization, the results differ markedly. For the values assumed above, conventional error diffusion results in the same pixel's receiving inks of all three colors. Also, a large negative error is generated for all colors and tends to prevent printing in the neighboring pixels. For light colors, printing thereby tends to be sparse and less likely to result in a smooth appearance.

But with the different-threshold approach of the present invention, the pixel receives only magenta ink, and this results in a large negative error for magenta only. Large positive errors result for cyan and yellow, with the attendant increased likelihood that ink of those colors will be deposited in neighboring pixels. The number of printed pixels is therefore greater, so the appearance is smoother. And this is all achieved without any significant complication of the error-diffusion process.

A little reflection reveals that the present invention's teachings are not limited to ranking three components. For instance, some applications might employ variable thresholds for only two of the components, say, cyan and magenta, leaving yellow with a fixed threshold. On the other hand, some applications may employ the variable thresholds not only for cyan, magenta, and yellow but also for the black ("K") component that the under-color removal process generates. To give an example of the latter type of system, FIG. 4 depicts the threshold-selection process 66 as selecting a threshold $T_K$ for the black component from among, say, four candidate thresholds, such as 127, 157, 187, and 217.

In such a system, the printer driver could simply send the printer the threshold-comparison results $C_B$, $M_B$, $Y_B$, and $K_B$. But under-color-removal systems typically perform a further operation. To depict this operation, FIG. 4 includes gates 68, 70, 72, 74, and 76, but these are only conceptual, since a printer driver will typically perform this operation without using dedicated hardware gates. The purpose of this operation is further replacement of the cyan-magenta-yellow combination with black. Although the simplest under-color-removal operations result in a zero value for at least one of the fine-resolution values C', M', and Y', not all under-color-removal operations do. And error augmentation in the error-diffusion operation 52 can result in situations in which the three threshold-comparison results $C_B$, $M_B$, and $Y_B$ are all ones even though one of the fine-resolution inputs C', M', and Y' is zero. In those cases, an OR gate 70 forwards a disabling signal from an AND gate 68 to gates 72, 74, and 76, whose outputs $C'_B$, $M'_B$, and $Y'_B$ thereby direct the printer not to deposit cyan, magenta, or yellow ink. Instead, gate 70's output is also employed as a $K'_B$ signal whose value, 1, requests that the printer deposit black ink. If the binary result $K_b$ of the threshold comparison for black is 1, gates 72, 74, and 76 are similarly disabled in favor of a request for black ink.

Figure 7:
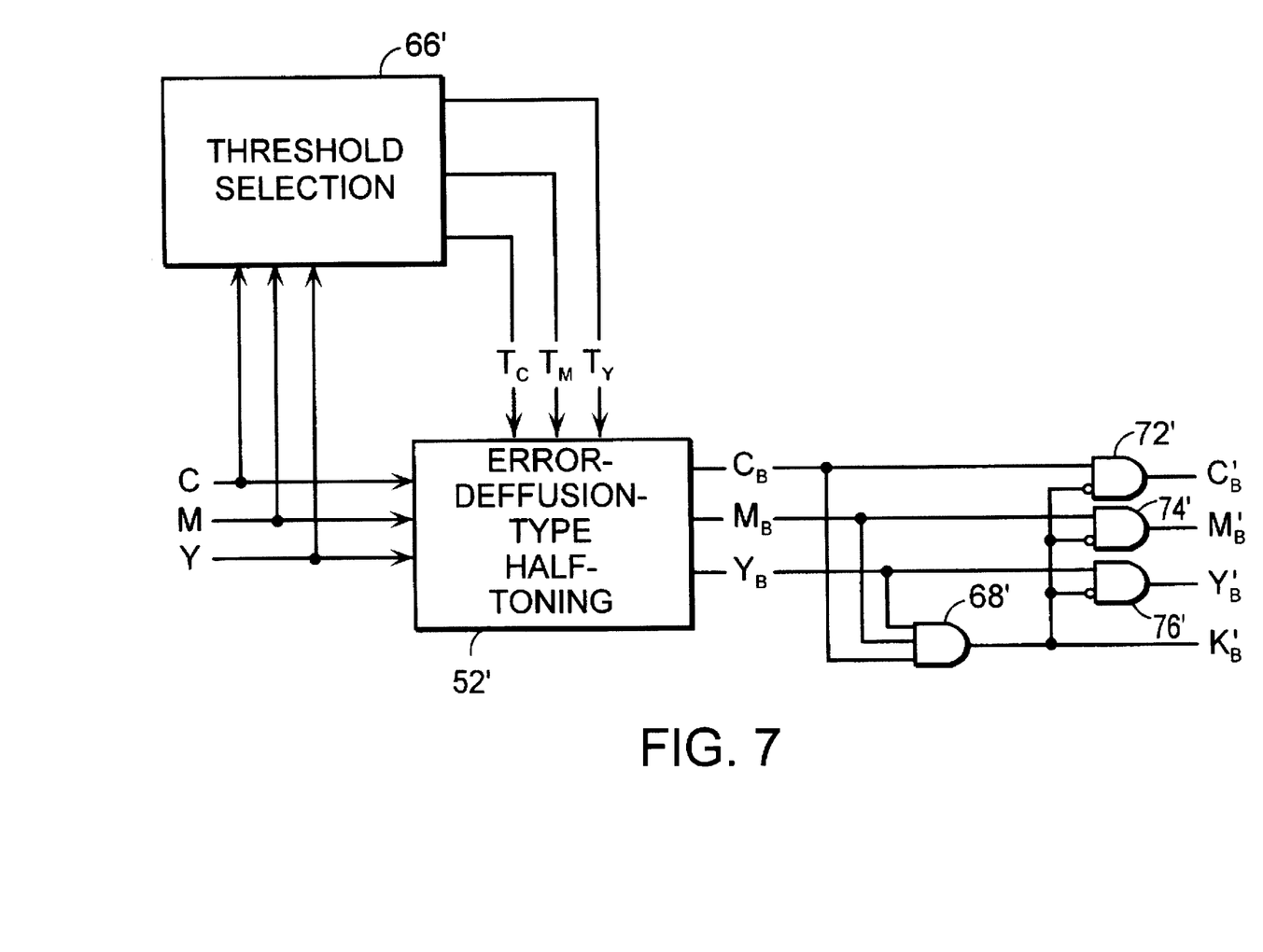
FIG. 7 is a conceptual block diagram that illustrates another version of FIG. 3's half-toning step.

FIG. 7 illustrates a four-color arrangement similar to that of FIG. 4, and FIG. 7 uses primed versions of the FIG. 4 reference numerals to refer to corresponding elements. The FIG. 7 arrangement differs from that of FIG. 4 in that it omits FIG. 4's undercolor-removal step. Its threshold-selection operation 66' therefore selects threshold for only three fine-resolution values. And the black printer-instruction component $K'_B$ results simply from ANDing the three threshold-comparison results $C_B$, $M_B$, and $Y_B$; no black-component threshold-comparison result enters into $K'_B$'s determination.

It will be appreciated as a result of the foregoing description that the present invention can be practiced in a wide range of embodiments. As was stated above, it can be employed not only in systems that use single-member threshold sets to result in binary quantization but also in systems that use multiple-member threshold sets to result in finer resolution. It can be employed both in systems that use undercolor removal and those that do not. And the variable threshold can be used for all or less than all of the color components. So the present invention can be employed in a wide range of embodiments and thus constitutes a significant advance in the art.

What is claimed is:

1. For operating a printing mechanism to produce a display in response to electrical source-image signals representing a source image consisting of an array of pixels, the value of each of which consists of more than one relatively fine-resolution component value associated with that pixel, a method comprising the steps of:

A) performing a sequence of at least one image-revision step, in which sequence each image-revision step receives an input image consisting of input pixels and produces therefrom an output image consisting of output pixels, the input image of the first image-revision step is the source image, the input image of any subsequent image-revision step is the output image of the preceding image-revision step, and one said image-revision step is a half-toning step that comprises performing, for each of a plurality of input component values associated with each pixel, an error-diffusion-type half-toning operation that generates a relatively coarse-resolution component value of a corresponding output pixel of the half-toning step in accordance with an error-augmented comparison of that input component value with:

i) a first threshold set if that input component value as augmented by the half-toning operation exceeds each other component value, as augmented by the half-toning operation, of a plurality of input component values associated with that pixel; and ii) a second threshold set if that input component value as augmented by the half-toning operation is less than each other component value, as augmented by the half-toning operation, of the plurality of input component values associated with that pixel; and B) applying to the printing mechanism electrical command signals that represent the output image produced by the last image-revision step.

2. A method as defined in claim 1 wherein the relatively coarse-resolution component value that the half-toning operation generates is a binary value, and the first and second threshold sets consist only of single, different first and second thresholds, respectively.

3. A method as defined in claim 2 wherein the first threshold is lower than the second threshold.

4. A method as defined in claim 1 wherein the error-diffusion-type half-toning operation generates the relatively coarse-resolution component value of the corresponding output pixel of the half-toning step in accordance with an error-augmented comparison of that input component value with a third threshold set different from the first and second threshold sets if that input component value as augmented by the half-toning operation exceeds another other component value, as augmented by the half-toning operation, of the plurality of component values associated with that pixel but is also less than another other component value, as augmented by the half-toning operation, of the plurality of component values associated with that pixel.

5. A method as defined in claim 4 wherein the half-toning operation generates a binary value, the first threshold set consists of a single first threshold, and the second threshold set consists of a single, different second threshold.

6. A method as defined in claim 5 wherein the relatively coarse-resolution component value that the half-toning operation generates is a binary value, and the first, second, and third threshold sets consist only of single, different first, second, and third thresholds, respectively.

7. A method as defined in claim 6 wherein the third threshold is higher than the first threshold and lower than the second threshold.

8. For operating a printing mechanism to produce a display, an apparatus comprising:

A) image-revision circuitry, responsive to electrical source-image signals representing a source image consisting of an array of pixels, the value of each of which consists of more than one relatively fine-resolution component value associated with that pixel, for performing a sequence of at least one image-revision step, in which sequence each image-revision step receives an input image consisting of input pixels and produces therefrom an output image consisting of output pixels, the input image of the first image-revision step is the source image, the input image of any subsequent image-revision step is the output image of the preceding image-revision step, and one said image-revision step is a half-toning step that comprises performing, for each of a plurality of input component values associated with each pixel, an error-diffusion-type half-toning operation that generates a relatively coarse-resolution component value of a corresponding output pixel of the half-toning step in accordance with an error-augmented comparison of that input component value with:

i) a first threshold set if that input component value as augmented by the half-toning operation exceeds each other component value, as augmented by the half-toning operation, of a plurality of input component values associated with that pixel; and ii) a second threshold set if that input component value as augmented by the half-toning operation is less than each other component value, as augmented by the half-toning operation, of the plurality of input component values associated with that pixel; and B) output circuitry responsive to the image-revision circuitry for applying to the printing mechanism electrical command signals that represent the output image produced by the last image-revision step.

9. An apparatus as defined in claim 8 wherein the relatively coarse-resolution component value that the half-toning operation generates is a binary value, and the first and second threshold sets consist only of single, different first and second thresholds, respectively.

10. An apparatus as defined in claim 9 wherein the first threshold is lower than the second threshold.

11. An apparatus as defined in claim 8 wherein the error-diffusion-type half-toning operation generates the relatively coarse-resolution component value of the corresponding output pixel of the half-toning step in accordance with an error-augmented comparison of that input component value with a third threshold set different from the first and second threshold sets if that input component value as augmented by the half-toning operation exceeds another other component value, as augmented by the half-toning operation, of the plurality of component values associated with that pixel but is also less than another other component value, as augmented by the half-toning operation, of the plurality of component values associated with that pixel.

12. An apparatus as defined in claim 11 wherein the half-toning operation generates a binary value, the first threshold set consists of a single first threshold, and the second threshold set consists of a single, different second threshold.

13. An apparatus as defined in claim 12 wherein the relatively coarse-resolution component value that the half-toning operation generates is a binary value, and the first, second, and third threshold sets consist only of single, different first, second, and third thresholds, respectively.

14. A method as defined in claim 13 wherein the third threshold is higher than the first threshold and lower than the second threshold.

15. A printing apparatus comprising:

A) a printing mechanism for applying ink to a medium in accordance with electrical print-command signals applied thereto;

B) image-revision circuitry, responsive to electrical source-image signals representing a source image consisting of an array of pixels, the value of each of which consists of more than one relatively fine-resolution component value associated with that pixel, for performing a sequence of at least one image-revision step, in which sequence each image-revision step receives an input image consisting of input pixels and produces therefrom an output image consisting of output pixels, the input image of the first image-revision step is the source image, the input image of any subsequent image-revision step is the output image of the preceding image-revision step, and one said image-revision step is a half-toning step that comprises performing, for each of a plurality of input component values associated with each pixel, an error-diffusion-type half-toning operation that generates a relatively coarse-resolution component value of a corresponding output pixel of the half-toning step in accordance with an error-augmented comparison of that input component value with:

i) a first threshold set if that input component value as augmented by the half-toning operation exceeds each other component value, as augmented by the half-toning operation, of a plurality of input component values associated with that pixel; and ii) a second threshold set if that input component value as augmented by the half-toning operation is less than each other component value, as augmented by the half-toning operation, of the plurality of input component values associated with that pixel;

C) output circuitry for applying to the printing mechanism electrical print-command signals that represent the output image produced by the last image-revision step.

16. A printing apparatus as defined in claim 15 wherein the relatively coarse-resolution component value that the half-toning operation generates is a binary value, and the first and second threshold sets consist only of single, different first and second thresholds, respectively.

17. A printing apparatus as defined in claim 16 wherein the first threshold is lower than the second threshold.

18. A printing apparatus as defined in claim 15 wherein the error-diffusion-type half-toning operation generates the relatively coarse-resolution component value of the corresponding output pixel of the half-toning step in accordance with an error-augmented comparison of that input component value with a third threshold set different from the first and second threshold sets if that input component value as augmented by the half-toning operation exceeds another other component value, as augmented by the half-toning operation, of the plurality of component values associated with that pixel but is also less than another other component value, as augmented by the half-toning operation, of the plurality of component values associated with that pixel.

19. A printing apparatus as defined in claim 18 wherein the half-toning operation generates a binary value, the first threshold set consists of a single first threshold, and the second threshold set consists of a single, different second threshold.

20. A method as defined in claim 19 wherein the relatively coarse-resolution component value that the half-toning operation generates is a binary value, and the first, second, and third threshold sets consist only of single, different first, second, and third thresholds, respectively.

21. A method as defined in claim 20 wherein the third threshold is higher than the first threshold and lower than the second threshold.

22. A storage medium containing instructions readable by a computer to configure the computer to function as a printer driver for operating a printer to produce a display, which printer driver includes:

A) image-revision circuitry, responsive to electrical source-image signals representing a source image consisting of an array of pixels, the value of each of which consists of more than one relatively fine-resolution component value associated with that pixel, for performing a sequence of at least one image-revision step, in which sequence each image-revision step receives an input image consisting of input pixels and produces therefrom an output image consisting of output pixels, the input image of the first image-revision step is the source image, the input image of any subsequent image-revision step is the output image of the preceding image-revision step, and one said image-revision step is a half-toning step that comprises performing, for each of a plurality of input component values associated with each pixel, an error-diffusion-type half-toning operation that generates a relatively coarse-resolution component value of a corresponding output pixel of the half-toning step in accordance with an error-augmented comparison of that input component value with:
  i) a first threshold set if that input component value as augmented by the half-toning operation exceeds each other component value, as augmented by the half-toning operation, of a plurality of input component values associated with that pixel; and
  ii) a second threshold set if that input component value as augmented by the half-toning operation is less than each other component value, as augmented by the half-toning operation, of the plurality of input component values associated with that pixel; and
B) output circuitry for applying to the printer electrical command signals that represent the output image produced by the last image-revision step.

23. A method as defined in claim 22 wherein the relatively coarse-resolution component value that the half-toning operation generates is a binary value, and the (first and second threshold sets consist only of single, different first and second thresholds, respectively.

24. A method as defined in claim 23 wherein the first threshold is lower than the second threshold.

25. A method as defined in claim 22 wherein the error-diffusion-type half-toning operation generates the relatively coarse-resolution component value of the corresponding output pixel of the half-toning step in accordance with an error-augmented comparison of that input component value with a third threshold set different from the first and second threshold sets if that input component value as augmented by the half-toning operation exceeds another other component value, as augmented by the half-toning operation, of the plurality of component values associated with that pixel but is also less than another other component value, as augmented by the half-toning operation, of the plurality of component values associated with that pixel.

26. A method as defined in claim 25 wherein the half-toning operation generates a binary value, the first threshold set consists of a single first threshold, and the second threshold set consists of a single, different second threshold.

27. A method as defined in claim 26 wherein the relatively coarse-resolution component value that the half-toning operation generates is a binary value, and the first, second, and third threshold sets consist only of single, different first, second, and third thresholds, respectively.

28. A method as defined in claim 27 wherein the third threshold is higher than the first threshold and lower than the second threshold.

* * * * *